United States Patent [19]

Zapata et al.

[11] Patent Number: 5,193,531
[45] Date of Patent: Mar. 16, 1993

[54] PROCESS AND APPARATUS FOR CONTROLLING A GAS PRESSURE AND SYSTEM FOR SUPPLYING GAS COMPRISING SUCH DEVICE

[75] Inventors: Richard Zapata, Sassenage; Jean Arnault, Saint Nazaire les Eymes, both of France

[73] Assignee: L'Air Liquide, Societe Anonyme Pour l'Etude et l'Exploitation des Procedes Georges Claude, Paris, France

[21] Appl. No.: 830,880

[22] Filed: Feb. 4, 1992

[30] Foreign Application Priority Data

Feb. 14, 1991 [FR] France .................. 91 01737

[51] Int. Cl.$^5$ .............. A61M 16/00; G01L 7/00
[52] U.S. Cl. ............... 128/204.21; 128/205.24; 128/200.24; 128/725; 73/182; 73/756
[58] Field of Search ............ 128/200.24, 204.18, 128/204.21, 205.24, 205.25, 205.11, 725, 201.28; 73/861.47, 861.67, 272 R, 274, 278, 279, 182, 756

[56] References Cited

U.S. PATENT DOCUMENTS

| | | | |
|---|---|---|---|
| 1,057,631 | 4/1913 | Fowler | 73/861.67 |
| 1,895,047 | 1/1933 | Neumann | 137/484.8 |
| 2,706,409 | 4/1955 | Preston | 73/861.67 |
| 3,631,850 | 1/1972 | Levasseur | 128/675 |
| 3,729,987 | 5/1973 | Chao | 73/861.67 X |
| 4,340,044 | 7/1982 | Levy | 128/204.21 |
| 4,498,347 | 2/1985 | Grantham | 73/861.66 |
| 4,644,803 | 2/1987 | Ward | 73/862.58 |
| 4,651,728 | 3/1987 | Gupta | 128/201.28 |
| 4,995,400 | 2/1991 | Boehringer | 128/725 |
| 5,076,267 | 12/1991 | Pasternack | 128/205.22 |

FOREIGN PATENT DOCUMENTS

| | | | |
|---|---|---|---|
| 0375281 | 6/1990 | European Pat. Off. | |
| 991203 | 1/1983 | U.S.S.R. | 73/756 |

*Primary Examiner*—Edgar S. Burr
*Assistant Examiner*—E. P. Raciti
*Attorney, Agent, or Firm*—Young & Thompson

[57] ABSTRACT

To compensate for load losses in a downstream part of a line for supplying gas under controlled pressure through a valve which is controlled by a pick-up upstream of the line, the pressure read by the pick-up is supplied by a pressure intake which is formed in a tube extending in the line and which is angularly orientable with respect to the flow of gas delivered. Application for example to systems of supplying breathing gas to the passengers of an airship.

12 Claims, 2 Drawing Sheets

PROCESS AND APPARATUS FOR CONTROLLING A GAS PRESSURE AND SYSTEM FOR SUPPLYING GAS COMPRISING SUCH DEVICE

BACKGROUND OF INVENTION (a) Field of the Invention

The present invention concerns a device and a process for controlling the pressure of a gas which is fed to a user station through a gas supply line originating from a source of gas.

(b) Description of Prior Art

The known devices of this type conventionally utilize a control valve which is placed in the gas supply line, a pressure pick-up connected to a point of the line downstream of the valve, and a control logic operating valve. In order to control the pressure in a volume with a continuous flow or with zero flow, the pressure pick-up may be mounted in the immediate vicinity of the user station. This enables the control to be carried out with precision and without problem. However, there are systems for supplying gas where, for example under conditions of overcrowding or interchangeability of the downstream elements of the system, the pick-up may not be physically mounted in the vicinity of the user station, but substantially upstream of the latter, so that the load losses between the pick-up and the user station then become substantial. Under such conditions, in the case of a control with a continuous flow, the control will give a pressure which is systematically too low at the user station and, in the case of a rapid control with a flow of material which is weak or void, first there will be a cut-off of the control valve when the predetermined pressure is reached, followed by a reopening when the pressures are balanced. One may consider an electronic correction of the pressure signal given by the pick-up to try to restore the expected predetermined values at the user station. However, this correction is extremely delicate to obtain since it depends on the instantaneous flow which is variable and in general is difficult to measure.

SUMMARY OF INVENTION

It is an object of the present invention to propose a device and a process of regulation enabling to carry out such correction in a simple, efficient and reliable manner, which is not costly and quick to implement.

For this purpose, according to a characteristic of the invention, the pressure pick-up is connected to the line by means of a pressure intake which projects into the line and is angularly orientable with respect to the flow of gas in the line. The pressure intake advantageously comprises a rotary tube, transversely disposed in the line and includes at least one orifice in its peripheral wall. The orifice is connected to the pressure pick-up.

According to another characteristic of the invention, the process comprises a step of orienting the pressure intake with respect to the flow of gas in the line to simulate the load loss in the portion of line between the pressure intake and the user station and to thus correct the pressure read by the pick-up.

The present invention also concerns a system of supplying a breathing gas to the passenger of an airship including a control device of the type defined above.

BRIEF DESCRIPTION OF DRAWINGS

Other characteristics and advantages of the present invention will appear from the description which follows of an embodiment, given by way of illustration but without limitation, with reference to the annexed drawings, in which.

DESCRIPTION OF PREFERRED EMBODIMENTS

Figure 1:
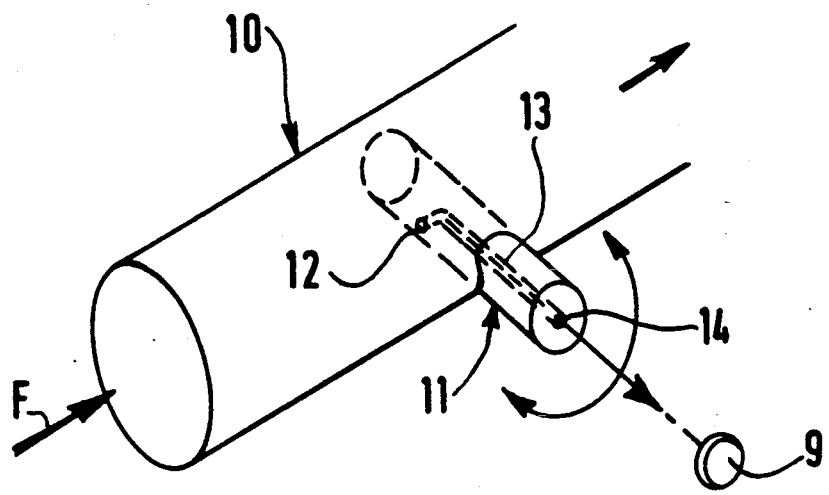
FIG. 1 is a schematic representation of an orientable pressure intake for carrying out the process according to the invention.

In the description which follows and in the drawings, identical or similar elements are identified by the same reference numerals.

Figure 3:
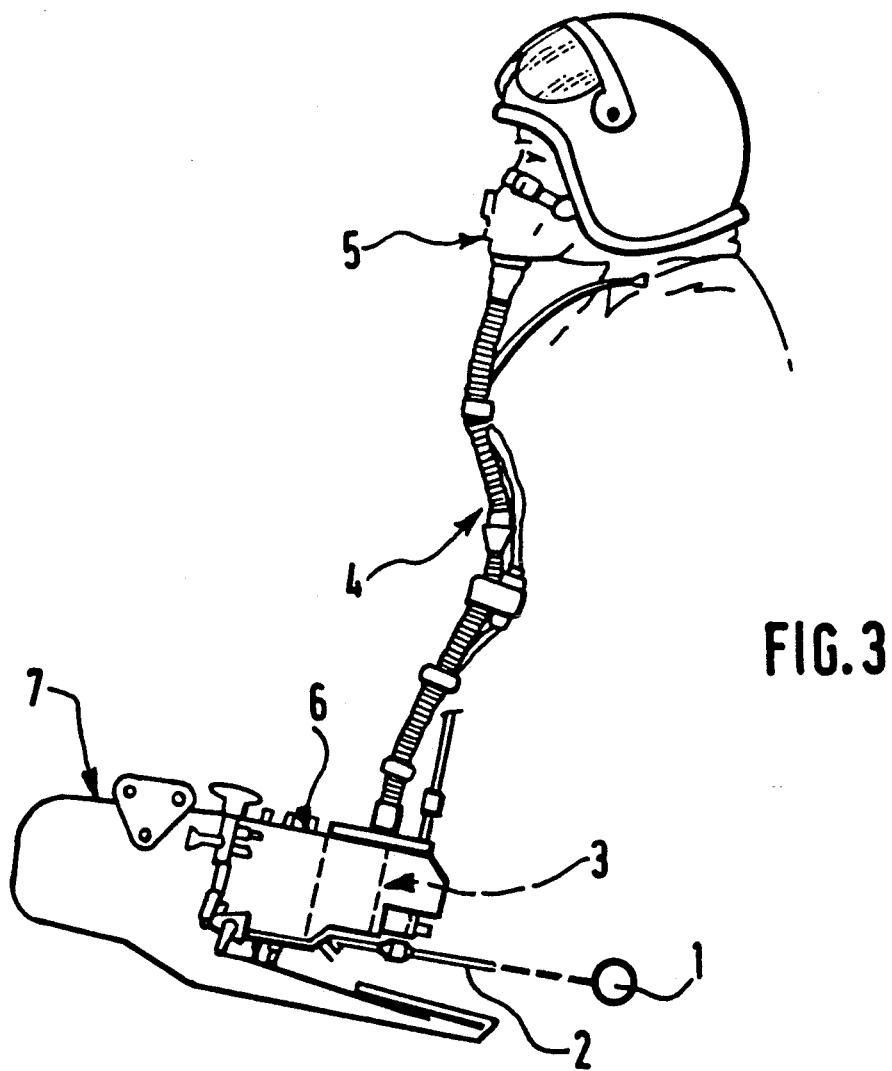
FIG. 3 is a schematic view of the lay-out of a system implemented according to FIG. 2.
Figure 2:
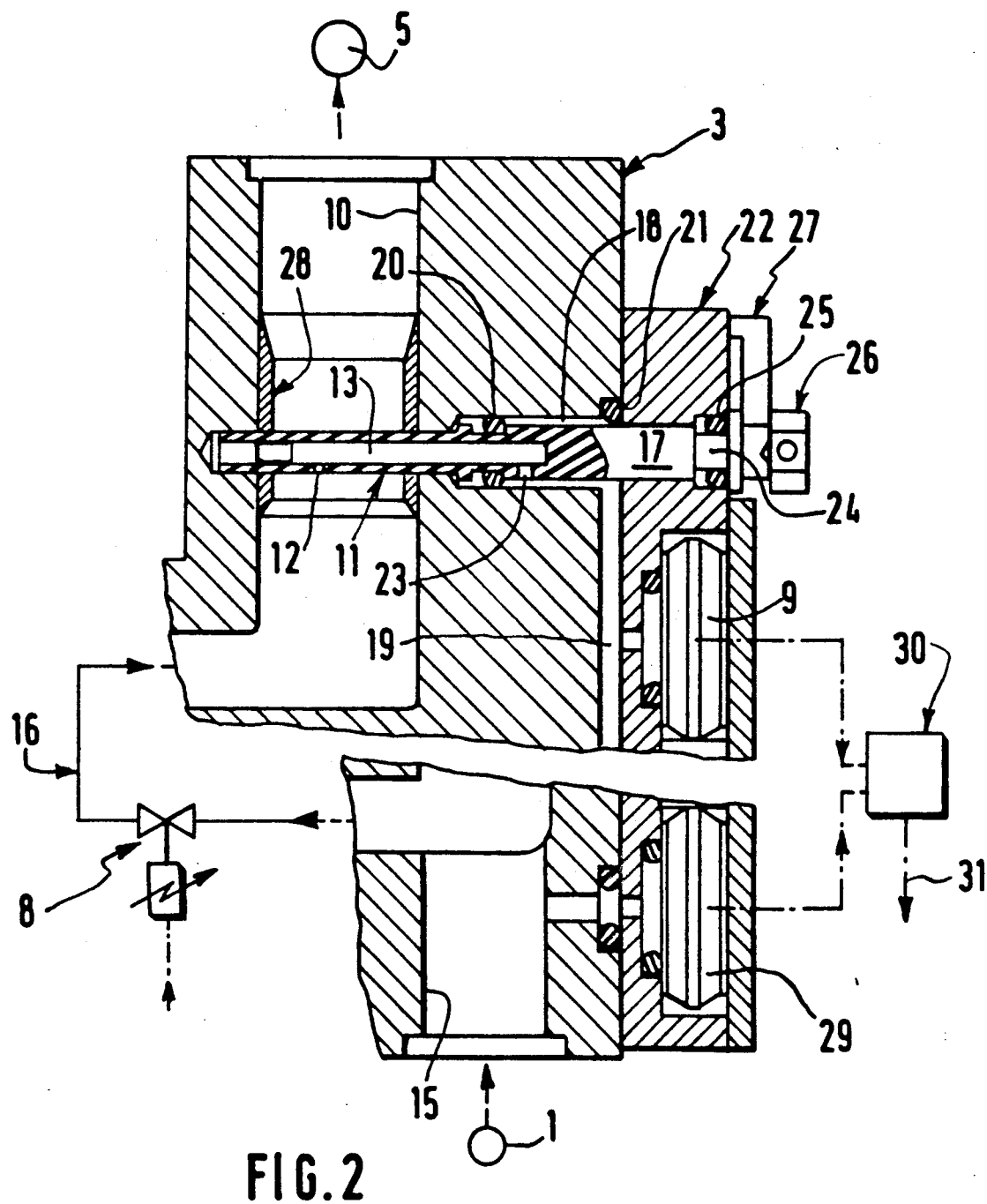
FIG. 2 is a schematic view, in partial cross-section, of a system of supplying breathing gas to the passenger of an airship incorporating a device according to the invention.

FIG. 3 represents a system for supplying breathing gas to the passenger of an airship essentially comprising a source of breathing gas 1 conveyed by a feeding duct 2 to a block 3 for controlling the pressure of the breathing gas fed through a line portion or "caterpillar" 4 to a breathing mask 5. The caterpillar 4 and the mask 5 constitute a detachable sub-assembly which is generally assigned to the user and, for reasons of overcrowding and implementation, the block 3 is incorporated into a distribution sub-assembly 6 mounted on the base 7 of the seat of the user, for example an ejectable seat. For these reasons, as seen in FIG. 2, the control valve 8, for example an electrovalve, and the pressure pick-up 9 detecting the pressure supplied downstream of a valve 8 should be incorporated into the block 6, i.e. at a substantial distance from the user station 5, with the above mentioned disadvantages of load losses in the tube 4.

According to the invention, in an upstream portion 10 of the line which connects valve 8 to the user station 5, an orientable pressure intake is mounted, the pressure intake advantageously consisting of a tube 11, transversely extending in the line portion 10, perpendicularly to the flow F of gas flowing in this line portion. Tube 11 includes in the part thereof located in the line portion 10, a laterally opening orifice 12 which communicates with an internal longitudinal duct 13 opening, at 14, outside tube 11 to be connected to the pressure pick-up 9 controlling the valve 8. In this manner, by angularly orienting the tube 11 so that the orifice 12 is angularly offset from the axis of the duct portion 10 by an angle $\theta$, the pressure read by the pick-up will be modified depending on the valve of $\theta$. If $P_{am}$ is the dynamic pressure corresponding to $\theta = 0$, the pressure read P will be such that:

$$P - \frac{P_{upstream}}{\frac{1}{2}\rho Vo^2} = 1 - 4\sin^2\theta$$

It will be seen that when $\theta$ varies between 0° and 90°, the pressure coefficient varies between about $+1$ and $-2.5$. If K is the coefficient of load loss in the line between the point of pressure intake and the user station, the pressure $P_u$ at the user station is such that:

$$P_{am} - P_u = K \times \tfrac{1}{2}\rho Vo^2$$

which means that, to simulate load loss, it is sufficient to adjust $\theta$ so that:

$$K = 4\sin^2\theta - 1$$

i.e. to select $\theta$ between 30° and 90°.

In the embodiment illustrated in FIG. 2, block 3 includes an inlet duct 15 connected to the source of gas 1, duct portion 10 connected to user station 5 and in which tube 11 is disposed, and a portion of circuit 16, incorporating valve 8, connecting duct 15 to duct portion 10.

Tube 11 is formed of a hollow end portion of a cylindrical member 17 rotatably mounted in body 3 and comprises an intermediate portion sealingly received in a chamber 18, which communicates, through a duct 19, with the pick-up 9, chamber 18 and duct 19 being sealed by means of an O-ring 20 between cylindrical member 17 and chamber 18, and a seal 21 between body 3 and a platen 22 associated with body 3 and in which the pick-up 9 is mounted. The inner duct 13 of tube 11 communicates with chamber 18 by means of another radial duct 23. The cylindrical member 17 includes, opposite tube 11, an end part 24 extending outside platen 22, which is sealed with an O-ring 25 and ends in an operating pin 26. A device 27 for locking and unlocking enables one to block the cylindrical member 17 in the required angular position. Adjustment is carried out at the plant by connecting at the outlet of the duct portion 10 a tube having the angular characteristics of the tube 4 to which it will later be connected and the operating pin 26 is activated so as to obtain at the user station 5 the required conditions after which the cylindrical member is blocked in the angular position thus obtained.

As seen in FIG. 2, according to an aspect of the invention, to obtain a more substantial compensation range, tube 11 axially extends through an insert 28 shaped as a venturi and disposed in duct portion 10, to locally accelerate the flow of gas opposite the pressure intake 12.

As seen in FIG. 2, the system of supplying breathing gas additionally includes, in the platten 22, at least another pressure pick-up 29 which detects the inlet pressure in the inlet duct 15, the pick-ups 9 and 29 supplying pressure signals to a control logic 30, which controls by means of a circuit 31, the control electrovalve 8, which is advantageously a three-way electrovalve of the type described in French Patent Application 9101736, entitled "Pneumatic Control Valve" filed on Feb. 14, 1991 in the French Patent office by the applicants.

Although the present invention has been described with respect to a specific embodiment, it is not limited thereby, but, on the contrary, is capable of modifications and variants which will appear to one skilled in the art.

We claim:

1. A device for controlling the pressure of a gas supplied to a user station from a source of gas via a gas supply line, comprising a control valve in the gas supply line connected to a control circuit means receiving signals from at least one pressure sensing orifice opening into the gas supply line downstream of the control valve, said pressure sensing orifice being formed in a pressure probe extending into a tubular line section of the gas supply line having an axis, and means for adjusting the orientation of the pressure probe relative to the axis.

2. The device of claim 1, wherein the pressure probe includes a tubular portion having a peripheral wall and extending transversely in the line section, said pressure sensing orifice being formed in the peripheral wall, and means are provided for adjusting the angular position of the tubular portion relative to the line section.

3. The device of claim 2, wherein the tubular portion extends diametrically through a portion of reduced internal dimension of the line section.

4. The device of claim 3, wherein the portion of reduced internal dimension is formed between a converging upstream portion and a diverging downstream portion.

5. The device of claim 2, wherein the tubular portion is journaled in a body part forming at least part of the line section and at least part of a fluid passage for interconnecting the sensing orifice to the pressure probe.

6. The device of claim 5, wherein the tubular portion has at least one communication orifice formed in the peripheral wall and opening into an annular chamber in the body part.

7. A breathing system for supplying at least one breathing gas to a user, comprising a gas supply line between a source of breathing gas and a user respiratory device, a control valve in a line section of the gas supply line not adjacent the user respiratory device, a first pressure sensing means for sensing the pressure in the line section downstream of the control valve and furnishing signals to a control circuit means operatively coupled to the control valve, a pressure probe extending into a part of the line section and formed with at least one pressure sensing orifice opening into the line section, and means for selectively orienting the pressure sensing orifice in the line section.

8. The system of claim 7, wherein the pressure probe is tubular and extends transversely into the line section, and means are provided for adjusting the angular position of the pressure probe relative to the line section.

9. The system of claim 8, wherein the pressure probe has a peripheral wall and the pressure sensing orifice is drilled in the peripheral wall.

10. The system of claim 7, further comprising a second pressure sensing means for sensing the pressure in the line section upstream of the control valve and furnishing signals to the control circuit means.

11. The system of claim 10, wherein the line section is formed in a pressure control assembly including the first and second pressure sensing means.

12. The system of claim 11, wherein the pressure control assembly is mounted on a user seat in an airship.

* * * * *